Oct. 8, 1929.  A. H. TESSIN  1,730,394

PIERCING DEVICE FOR DOUGH DIVIDERS

Filed Feb. 6, 1928

INVENTOR
ARTHUR H. TESSIN.
BY
*George B. Willcox*
ATTORNEY

Patented Oct. 8, 1929

1,730,394

UNITED STATES PATENT OFFICE

ARTHUR H. TESSIN, OF SAGINAW, MICHIGAN, ASSIGNOR TO BAKER PERKINS COMPANY, INC., OF SAGINAW, MICHIGAN, A CORPORATION OF NEW YORK

PIERCING DEVICE FOR DOUGH DIVIDERS

Application filed February 6, 1928. Serial No. 252,130.

This invention relates to a gas venting device for inducing the escape of gas from the interior of a dough piece while the dough is being measured in the measuring pocket of a dough dividing machine.

The object of the invention is to provide means for piercing through or impaling the dough piece while it is being pushed into the measuring pocket and prior to being sheared off to form a loaf of standard weight.

The measuring pocket of the ordinary dough divider receives dough forced into it by a ram, there being a piston in the measuring pocket which recedes from the intake end of the pocket as the dough is pushed in. The predetermined volume of dough having been pushed and pressed into the measuring pocket, the dough mass is sheared off at the intake, leaving in the pocket an exactly measured volume. It is desirable, however, not only to secure accurate volume, but also as nearly as possible uniform density and consequently accurate weight.

Gas pockets, resulting from fermentation induced by proofing, are sometimes formed within the dough mass, and if the individual gas pockets happen to be irregular in size and unevenly distributed successive measured volumes of dough will in consequence differ in weight.

The tenacity of the dough and the fact that it is pushed into the measuring pocket under pressure normally prevents gas liberation.

My invention is characterized by provision for automatically venting all parts of the dough piece while being forced into the measuring pocket. The larger pockets of gas are adequately vented and uniform dough-piece weights are maintained within commercial limits.

A venting device made according to my invention and applied to a dough divider operates without altering the usual functions of the measuring pocket and its piston, or of the dough hopper and ram.

With the foregoing and certain other objects in view, which will appear later in the specification, my invention comprises the devices described and claimed and the equivalents thereof.

In the drawings Fig. 1 is a part sectional side view of a dough measuring pocket embodying my improved piercing device.

Figure 1:
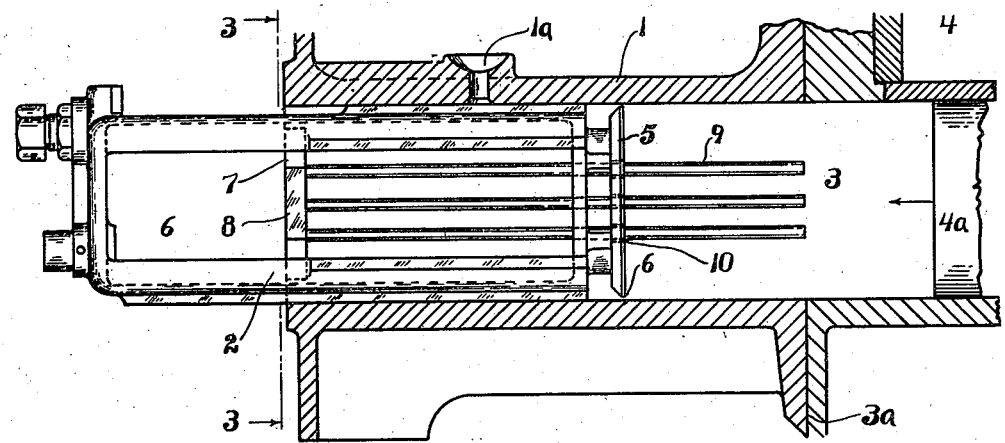
Figure 2:
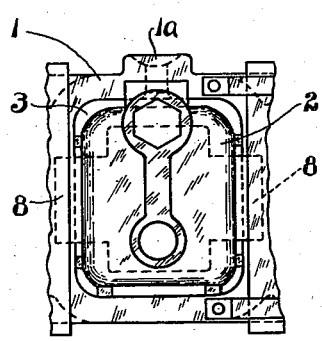
Fig. 2 is an end view.

As is clearly shown in the drawings, numeral 1 indicates the usual dough measuring pocket, preferably of rectangular cross section, within which is a slidable skeleton displacement piston 2.

The pocket 1 when positioned for filling registers with a chamber 3, through which dough is supplied from an overhead hopper 4. Dough is being forcibly pushed into the pocket 1 by a ram $4^a$, that being the usual mode of operation of dough dividing machines.

The chamber 3 and hopper 4 are stationary, and the measuring pocket 1 when filled can be slid upon the end face $3^a$ of chamber 3 to automatically shear off the measured dough piece contained in the pocket. It will, therefore, be understood that suitable provision is made, as is usual in dough dividers, for shearing off the dough piece after it has been rammed into the measuring pocket.

Piston 2 recedes as dough is forced against it by ram $4^a$ and when it comes to the end of its travel an exact volume of dough is in the cylinder ready to be sheared off.

Figure 3:
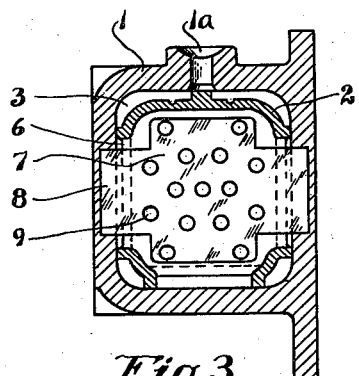
Fig. 3 is a section on line 3—3 of Fig. 1.

The receding face of the piston is preferably provided with a face-plate 5 formed with scraping edges 6 that automatically remove particles of dough from the walls of the pocket. Piston 2 is skeletal, having longitudinal openings 6 in its two sides. Across the back end of the pocket is a plate 7 with lateral extensions 8 projecting through the openings 6 of the piston. The extensions are inset in the rear ends of the side walls of pocket 1. The horizontal openings 6 permit the piston to slide back and forth in the pocket without encountering the extensions 8 of plate 7. A number of piercing implements, preferably longitudinally extending rods 9, or tubes or bars of any suitable cross sectional shape are secured to plate 7. They are spaced apart, for example as shown in Fig. 3, where several of them are distributed more or less uniformly over the cross sectional area of the pocket. The free ends of the rods 9 extend through holes 10 in the face-plate 5 slightly larger than the rods. While the face-plate 5 moves back with the dough the piercing rods 9 impale the mass throughout its length. The pressure within any cavity that happens to be pierced drives the entrapped gas along the rod and vents it through the holes 10 in the face-plate 5 around the rods 9, as indicated by the arrow in Fig. 1.

The inner wall areas of pocket 1 and the face of plate 5 are lubricated through channels 1ª, in the usual way, and the piercing rods 9 are lubricated by the wiping action of the apertured plate 5 as it travels back and forth along the rods.

In practical operation while the dough mass is being forced into the cylinder there is a very pronounced escape of gas through the holes 10 around the rods, probably due to the fact that while the mass of dough is entering the pocket there is greater internal pressure in that part of the mass nearest ram 4ª than there is in the part nearest plate 5, because while the ram is driving the dough into the pocket the receding plate 5 is relieving pressure at that end of the mass, instead of augmenting it as ram 4ª is doing. While the dough is being forced into the pocket in this manner it possesses somewhat the characteristics of a fluid in motion within a pipe. Hence with such a difference of internal pressure within the mass it can be easily vented from end to end by piercing lengthwise, as above explained.

Having thus described my invention, what I claim and desire to secure by Letters Patent is:

1. In combination, a dough-measuring pocket, a plurality of parallel rods spaced apart and extending lengthwise of said pocket and fixed therein near an end thereof, a retractable piston having a face-plate formed with holes in which said rods are slidingly received, said holes serving as vents for escape of gas along said rods, and means for lubricating said piston and rods, for the purposes set forth.

2. In a dough-measuring pocket, longitudinally extending rods therein, a retractable piston, its face formed with holes receiving said rods and constituting vent passages contiguous thereto, and means adapted to produce relative longitudinal movement of said piston and rods whereby said rods are caused to increasingly protrude beyond the face of said piston as the latter retracts, and means for lubricating said rods, for the purposes set forth.

3. In a dough-measuring pocket, longitudinally extending rods fixed therein near an end thereof, and a retractable piston having a face formed with holes slidingly receiving said rods and also constituting vent passages through the piston, contiguous to the rods, and devices adapted to supply lubricant to said rods, for the purposes set forth.

4. In combination with the open ended measuring cylinder and movable piston and ram of a dough dividing machine, a plurality of piercing implements associated with said cylinder and adapted to pierce a mass of dough therein, thereby venting gas therefrom, while said dough is being forced into the cylinder by said ram.

In testimony whereof, I affix my signature.

ARTHUR H. TESSIN.